United States Patent [19]

Boettcher et al.

[11] Patent Number: 4,629,277
[45] Date of Patent: Dec. 16, 1986

[54] ELECTRICAL APPARATUS

[75] Inventors: Bodo Boettcher, Zorneding; Werner Rupprecht, Tuerkenfield, both of Fed. Rep. of Germany

[73] Assignee: Raychem Corporation, Menlo Park, Calif.

[21] Appl. No.: 653,379

[22] Filed: Sep. 20, 1984

[30] Foreign Application Priority Data

Sep. 22, 1983 [GB] United Kingdom ............... 8325402

[51] Int. Cl.[4] .......................................... H01R 11/05
[52] U.S. Cl. ............................. 339/111; 339/DIG. 1
[58] Field of Search .............. 339/DIG. 1, 111, 143 R

[56] References Cited

U.S. PATENT DOCUMENTS

| 3,401,370 | 9/1968 | Weinfurt et al. | 339/143 R |
| 3,509,516 | 4/1970 | Phillips | 339/111 |
| 3,582,868 | 6/1971 | Trimble et al. | 339/DIG. 1 |
| 3,663,928 | 5/1972 | Keto et al. | 339/111 |
| 3,924,919 | 12/1975 | McClain | 339/111 |
| 4,415,217 | 11/1983 | Clabburn et al. | 339/DIG. 1 |

FOREIGN PATENT DOCUMENTS

| 8207923.4 | 3/1983 | Fed. Rep. of Germany . |
| 8207925.0 | 3/1983 | Fed. Rep. of Germany . |
| 1149125 | 4/1969 | United Kingdom . |
| 1232755 | 5/1971 | United Kingdom . |
| 1254352 | 11/1971 | United Kingdom . |
| 1334969 | 10/1973 | United Kingdom . |
| 1334556 | 10/1973 | United Kingdom . |
| 1395642 | 5/1975 | United Kingdom . |
| 1440122 | 6/1976 | United Kingdom . |
| 1572038 | 7/1980 | United Kingdom . |
| 2116381 | 9/1983 | United Kingdom . |
| 2128040 | 4/1984 | United Kingdom . |

OTHER PUBLICATIONS

"Disconnectable Termination for Paper Insulated Cables", Electrical Review, vol. 210, No. 10, 12 Mar. 1982.
Unpublished version of G.B. Pat. No. 2105533, Klopfer.

Primary Examiner—John McQuade
Attorney, Agent, or Firm—Edith A. Rice; Herbert G. Burkard

[57] ABSTRACT

The invention provides an L-shaped connector for connecting a high voltage electric cable to a bushing of a transformer, switchgear, or other electrical apparatus. A first arm of the connector is tapered to be a push-fit on to the bushing, and the other arm has a heat-shrinkable tubing integral therewith for receiving, and sealing on to, a stripped cable. Electrical connection to the cable is made completely within the insulating body of the connector, by a screw-threaded pin that is accessed through the first arm of the connector.

10 Claims, 9 Drawing Figures

ELECTRICAL APPARATUS

This invention relates to a connector for electrically connecting a high voltage electric cable to electrical apparatus, for example, so as to allow connection of the cable to the terminal of a bushing of a transformer or switchgear.

By high voltage is meant voltages in excess of about 1 kV, and especially in excess of about 5kV.

One such connector has been disclosed by Yorkshire Switchgear and Engineering Co.Ltd (Electrical Review, Volume 210, Number 10, of Mar. 12, 1982), for terminating plastic or paper insulated cable. The connector comprises a T-shaped elastomeric insulating body that has aligned tapered bores in each cross arm of the "T" that are arranged respectively to fit on to an insulated bushing of switchgear, and to provide access for securing the electrical conneciton between the cable and the bushing terminal. An elongate spade terminal is integrally moulded into the body along the stem of the "T" such that one end is disposed between the transversely-extending bores, for connection to the bushing terminal, and such that the other end extends out beyond the insulating body, for connection to the cable, outside the insulating body of the connector, by means of a cable lug or by crimping. A separate heat shrinkable tube is provided with the connector. The tube is pre-positioned along the cable, and after the cable has been connected to the connector is re-positioned so as to encompass and protect the electrical connection therebetween after heat has been to effect its recovery.

Another such connector, for use with plastic insulated cable, is disclosed in Gebrauchsmuster No. 82 07 923.4. This connector comprises an L-shaped insulating body and receives one end of a stripped cable as a push-fit in one arm such that the conductor of the cable is accessible for electrical connection thereto from the second arm. To this end, the cable conductor is arranged to extend into a metal clamping arrangement that is secured within the connector body, whereby two screws are tightened on to the conductor, with access thereto being obtained through the second arm. The clamping arrangement also carries a contact pin extending along the second arm to make the electrical connection from the cable to, for example, a bushing of a transformer or switchgear. It will be appreciated that owing to the push-fit mounting arrangement of cable into the connector, a different connector will be required for each size, that is diameter, cable.

It is an object of the present invention to provide a connector that allows electrical, and mechanical, interconnection to be made between a high voltage electric cable of any type, including plastic and paper insulated cable, and electrical apparatus in a particularly convenient and versatile manner.

In accordance with one aspect of the present invention, there is provided a connector suitable for connecting a high voltage electric cable to electrical apparatus, the connector comprising: an electrically insulating body having a first socket for receiving an electrical terminal of the apparatus, and a recoverable second socket for receiving a stripped end of the cable; and electrically conductive means for providing a conductive path between the first and second sockets thereby, in use, to provide electrical interconnection between the cable and the terminal of the apparatus, the electrically conductive means being contained wholly within the insulating body of the connector.

By locating the electrically conductive means wholly within the insulating body, electrical and environmental protection of the connection between the cable and the connector can very easily and conveniently be achieved simply by recovering the second socket around the inserted cable. Furthermore, the connector of the present invention can thus, because of the recoverable component, be used with cables of a large range of sizes.

The electrically conductive means may be made from any suitable material, such as brass or aluminum, for example.

Preferably, the second socket comprises a non-recoverable portion, which may be integral with the first socket, and has a recoverable portion that is of tubular configuration at an end thereof through which, in use, the cable is introduced. Advantageously, the recoverable tubing is moulded into the non-recoverable portion of the insulating body of the connector, preferably after having been recovered at its inner end on to a tubular support member made, for example, of rigid plastics material. The support member may be profiled so as to direct the recoverable portion, on recovery, gradually down on to the outer jacket of the cable.

In connectors where access to the electrically-conductive means is required to effect connection to the cable, this may conveniently be achieved through the first socket.

In order to provide a void-free connection of the connector on to the electrical apparatus, preferably at least the first socket, and most preferably the entire non-recoverable portion, of the insulating body is formed from an elastic material so as to receive the cable as a push-fit. A rubber or elastomeric material is preferred. A more rigid insulating material, such as epoxy resin, may, however, be used, but a sealant, such as silicone grease, will then be required to eliminate voids that could otherwise lead to undesirable electrical discharge activity.

It will be appreciated that recovery of the second socket on to the cable will provide mechanical retention of the cable in the connector.

Preferably, the recoverable portion comprises a sleeve of heat-recoverable polymeric material, for example as sold by Raychem under the name HVTM. Alternatively, though more expensively, the insulating body and the recoverable portion may be made integrally of the same material, for example by moulding.

At voltages above about 6 kV, it is usually necessary to provide electrical stress control at the termination of an electric cable. This can be achieved with the present connector, for example, by coating the inside of the recoverable socket with a stress grading mastic. Suitable materials for this are disclosed in British Patent Specification Nos. 1470501, 1470502, 1470503 and 1470504, the disclosures of which are incorporated herein by reference. As an alternative, such stress control may be provided by applying a stress control tubing to the stripped cable before it is introduced into the connector. Tubing sold by Raychem under the name SCTM is particularly suitable for this.

Reference herein to the cable being "stripped" for insertion into, and electrical connection to, the connector is to be understood to be the successive removal of portions of the cable outer jacket, and insulating and electrical screening layers, as appropriate, thereby to expose these cable components and also the cable conductor, in the same manner as if the cable were subsequently to be terminated in a conventional manner, such as, for example, by a termination kit containing heat shrinkable components sold for that particular cable configuration by Raychem. It is to be understood that in general it will not be necessary to apply a cable lug to the conductor at the end of the stripped cable, so that connection of the electrically conductive means of the connector will thus be directly on to the cable conductor itself. However, in some instances it may be desirable to mount a connecting lug, for example by crimping, on the conductor, and reference herein to contact between the electrically conductive means and the conductor is to be understood to include contact with a cable lug, or the like, that is itself directly connected to the conductor.

The word "recoverable" as used herein is defined as follows: a recoverable article is an article the dimensional configuration of which may be made to change appreciably when subjected to the appropriate treatment. The article may be heat-recoverable such that the dimensional configuration may be made to change when subjected to a heat treatment.

Usually these articles recover, on heating, towards an original shape from which they have previously been deformed, but the term "heat-recoverable", as used herein, also includes an article which, on heating, adopts a new configuration, even if it has not been previously deformed.

In their most common form, such articles comprise a heat-shrinkable sleeve made from a polymeric material exhibiting the property of elastic or plastic memory as described, for example, in U.S. Pat. Nos. 2,027,962; 3,086,242 and 3,597,372. As is made clear in, for example, U.S. Pat. No. 2,027,962, the original dimensionally heat-stable form may be a transient form in a continuous process in which, for example, an extruded tube is expanded, whilst hot, to a dimensionally heat-unstable form, but, in other applications, a preformed dimensionally heat stable article is deformed to a dimensionally heat unstable form in a separate stage.

The polymeric material may be cross-linked at any stage in its production that will enhance the desired dimensional recoverability. One manner of producing a heat-recoverable article comprises shaping the polymeric material into desired heat-stable form, subsequently cross-linking the polymeric material, heating the article to a temperature above the crystalline melting point or, for amorphous materials the softening point, as the case may be, of the polymer, deforming the article and cooling the article whilst in the deformed state so that the deformed state of the article is retained. In use, since the deformed state of the article is heat-unstable, application of heat will cause the article to assume its original heat-stable shape.

In other articles, as described, for example, in British Patent No. 1,440,524, an elastomeric member such as an outer tubular member is held in a stretched state by a second member, such as an inner tubular member, which, upon heating weakens and thus allows the elastomeric member to recover.

Since the recoverable socket of the connector of the invention is preferably arranged to extend for a length sufficient to contact the outer jacket of the stripped cable, secure electrical connection between the cable conductor and the electrically conductive means of the connector may be arranged to occur automatically on full insertion of the cable into the second socket. Alternatively, or additionally, such electrical connection may be made subsequent to insertion of the cable into the connector by urging a component of the electrically conductive means into contact with the conductor, with access being gained through the first socket. In a preferred embodiment, the electrically conductive means comprises a screw-threaded contact pin and an open-ended housing, preferably made of metal, having a mating internally threaded aperture in a side thereof, secured in the insulating body at the inner end of the second socket. In this embodiment, the stripped cable is introduced into the second socket so as to dispose the conductor in the housing. The contact pin, accessed through the first socket is then tightened so as to engage the conductor, thereby providing electrical connection and also assisting in the mechanical retention of the cable in the connector.

Alternatively, the electrically conductive means may comprise a pin member that is permanently retained within the insulating body of the connector, for example by being moulded, or otherwise formed, integrally therewith. The pin member will then be electrically connected to means for retaining within the connector the end of a cable that, in use, is introduced into the second socket of the connector.

The first socket of the connector is preferably inwardly tapered, in conformity with the frusto-conical configuration of a typical bushing, for example the European standard Cenelec bushing, used on transformers and switchgear.

The two sockets may extend at an angle, for example generally at right angles, to one another, or may be axially aligned with one another. The connector may advantageously have a generally L-shape, for example for connecting a vertically rising cable on to a horizontally projecting bushing of electrical equipment.

The connector may have a further socket that provides access to the introduced electrical cable. This further socket, which generally will be closed and sealed by a mating plug, may itself be such as to allow an alternative connection on to a bushing of electrical apparatus by, for example, being of a different shape or size from the first socket. Alternatively, the further socket may be arranged to provide physical access to the cable, for example to allow connection to be made between the cable and the electrical apparatus.

The connector is preferably arranged such that a push-fit engagement may be provided between the first socket and the electrical apparatus, usually a terminal bushing thereof, and the connector may comprise means for effecting mechanical retention thereof on to the apparatus. Such means may be embedded in the insulator body, and may be electrically conductive. In one embodiment, such embedded conductive retentions means may comprise a projection from the insulator body that may also serve as an earthing point, to provide a common earth for the electrical apparatus and the cable screen. In another embodiment, such embedded conductive retention means may extend within the insulator body such as to provide electrical screening for the connector.

The inner wall of the second socket of the connector may advantageously be arranged for accommodation of more than one size cable. The wall may, for example, have one or more steps so that cables of significantly different diameter extend to a greater or lesser degree into the connector. As an alternative, the inner wall may be tapered, preferably uniformly, and an insert may be provided, sized and shaped to suit a particular cable, so as to be located intermediate the cable insulation and the socket inner wall.

Since the connectors of the present invention are suitable for mounting on to electrical apparatus as a push-fit, possibly with some further means of mechanical retention, it will be appreciated that they are also easily demountable from the apparatus.

High voltage cable connectors, each in accordance with the present invention, will now be described, by way of example, with reference to the accompanying drawings, in which.

The connectors shown in the drawings are suitable for operation up to about 17.5 kV, at a current rating of up to about 400 A. Each is formed, as a moulding, from a body of elastic electrically insulating material, such as polyurethane or EPDM (ethylene propylene diene monomer), and a stem projecting therefrom that comprises a heat shrinkable tube of insulating material sold by Raychem under the name HVTM.

The connectors have two sockets at right angles to each other, one of the sockets provides a bore that is shaped to mate sealingly on to a frusto-conical bushing (not shown) designed by CENELEC that is the standard bushing in Europe for terminal fittings of transformers, switchgear, and other high voltage electrical apparatus. The bushing carries along its axis an electrical contact member for connection through the electrical connecting means of the connector with a cable that is introduced into and secured within the bore of the other socket of the connector. This other socket comprises the above-mentioned heat-shrinkable stem. The electrical connecting means is secured within the connector so as to receive, and interconnect, the bushing contact member and the conductor of the cable.

Figure 1:
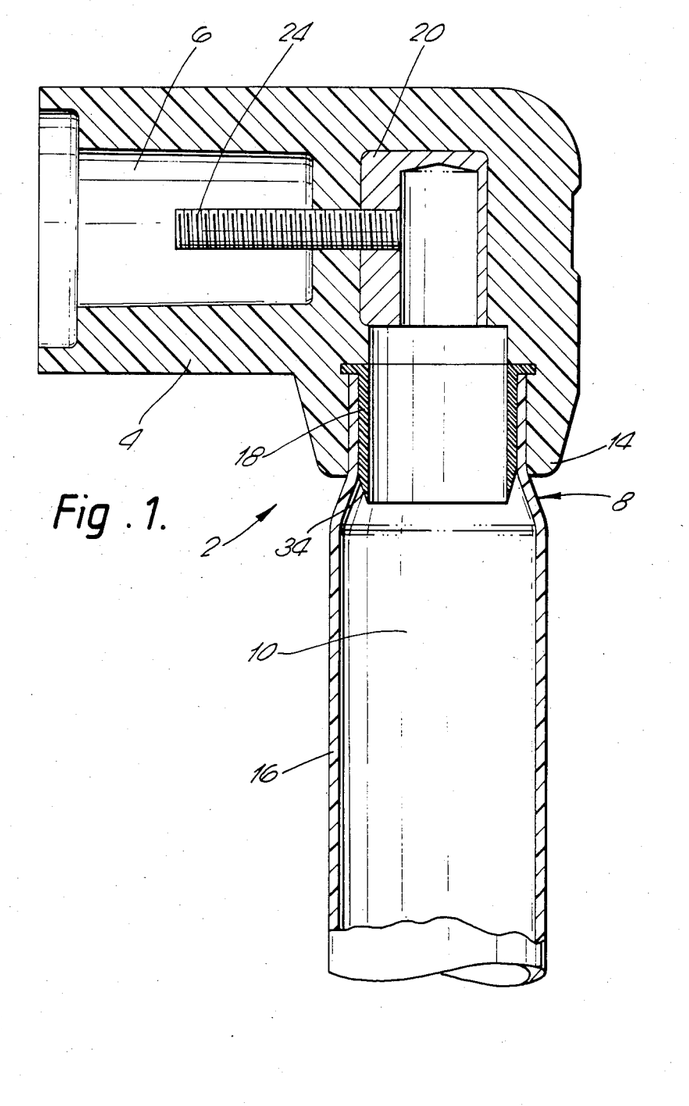
FIG. 1 is a section through one embodiment of connector.
Figure 2:
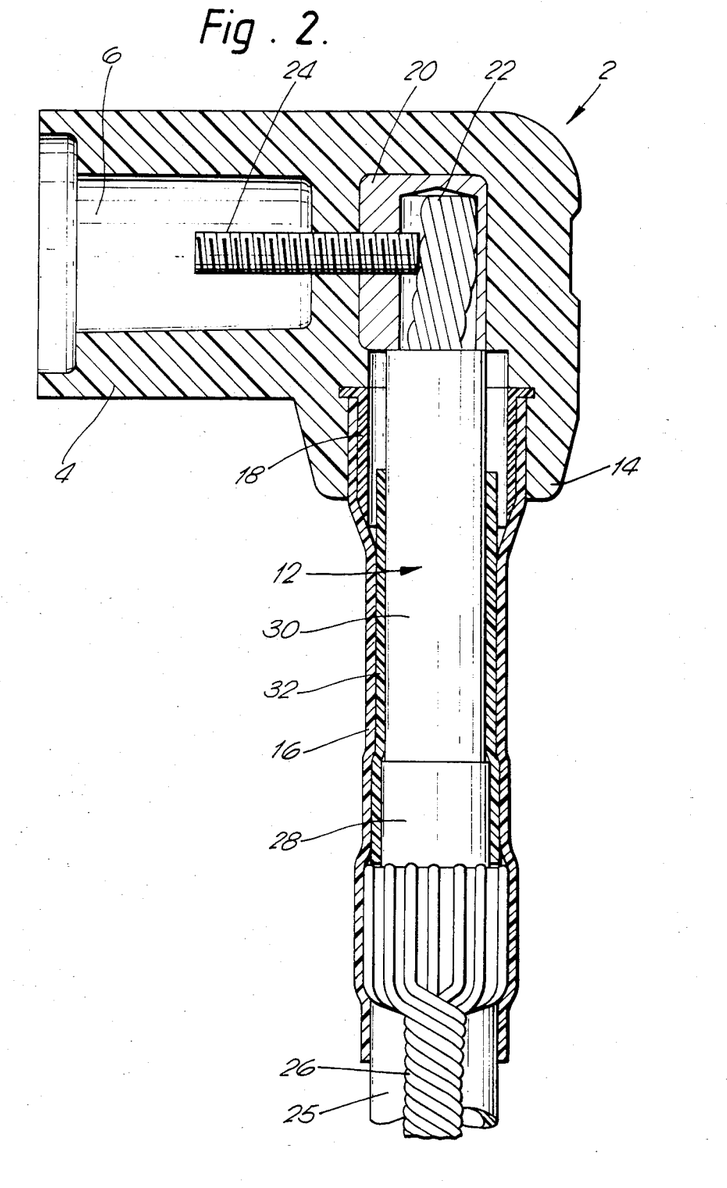
FIG. 2 shows the connector of FIG. 1 after mounting on to a cable.

Referring now in particular to FIGS. 1 and 2, a connector 2 has one socket 4 providing an inwardly-tapering bore 6 for connection on to a transformer bushing (not shown). The orthogonal socket 8 provides another bore 10 for receiving the stripped end of a high voltage cable 12 (FIG. 2). The socket 8 comprises a stub portion 14, that is moulded integrally with as the socket 4, and heat shrinkable HVTM tubing 16 extending therefrom. In manufacture, one end of the tubing 16 is recovered on to a tubular rigid plastic insert 18 that is flanged at one end. The insert 18 with the tubing 16 recovered thereon is moulded into the material that forms the connector body to be retained therein, assisted by the flange.

A brass housing 20, that is embedded in the material forming the socket 4 and the stub 14, has a first opening, aligned with the socket 8, for receiving the bare conductor 22 (FIG. 2) of the cable 12, and a second, threaded opening, aligned with the bushing socket 4 for receiving a threaded contact pin 24.

The cable 12 (FIG. 2) is a 17.5 kV screened single core plastic insulated cable (without armour), and is prepared for insertion into the connector 2 as described in detail in the corresponding Raychem Installation Instructions for conventionally terminating such a cable, except that the final steps involved in a cable termination, namely the crimping of a connecting lug on to the exposed conductor, and the provision of an outer non-tracking weather resistant tubing, are omitted. Thus, as can be seen from FIG. 2, the cable is stripped to expose successively beneath the outer PVC jacket 25, metal shield wires 26, a semi-conducting screen 28, insulation 30, and the stranded conductor 22, with the exposed, cut-back lengths being in accordance with standard practice as set out in the above-mentioned Installation Instructions.

Finally, a stress control tubing 32, as sold by Raychem under the name SCTM, is applied over the screen 28 and along the specified length of the insulation 30.

The cable 12 thus prepared is freely inserted into the socket 8 of the connector 2 so as to dispose the exposed conductor 22 within the conductive housing 20,the length of the HVTM tubing 16 being such that the entire length of the SCTM tubing 32 and a portion of the shield 26 is encompassed. The contact pin 24, accessed through the socket 4 and having a slotted free end, is screwed through the threaded side-wall aperture of the housing 20 to provide good mechanical and electrical contact on to the conductor 22. Heat is then applied to the HVTM tubing 16 to cause it to shrink radially down on to the cable 12, providing an outer non-tracking, weather-resistant cover over the SCTM tubing 32, and sealing on to the cable jacket 24. Since the connector 2 is for use with cables of a variety of sizes, and in order to provide a smooth transition in diameter from the outer diameter of the insert 18 within the connector stub 14 down to the outer diameter of the inserted cable, the free end 34 of the insert 18 is smoothly chamfered.

Figures 3, 4, 5:
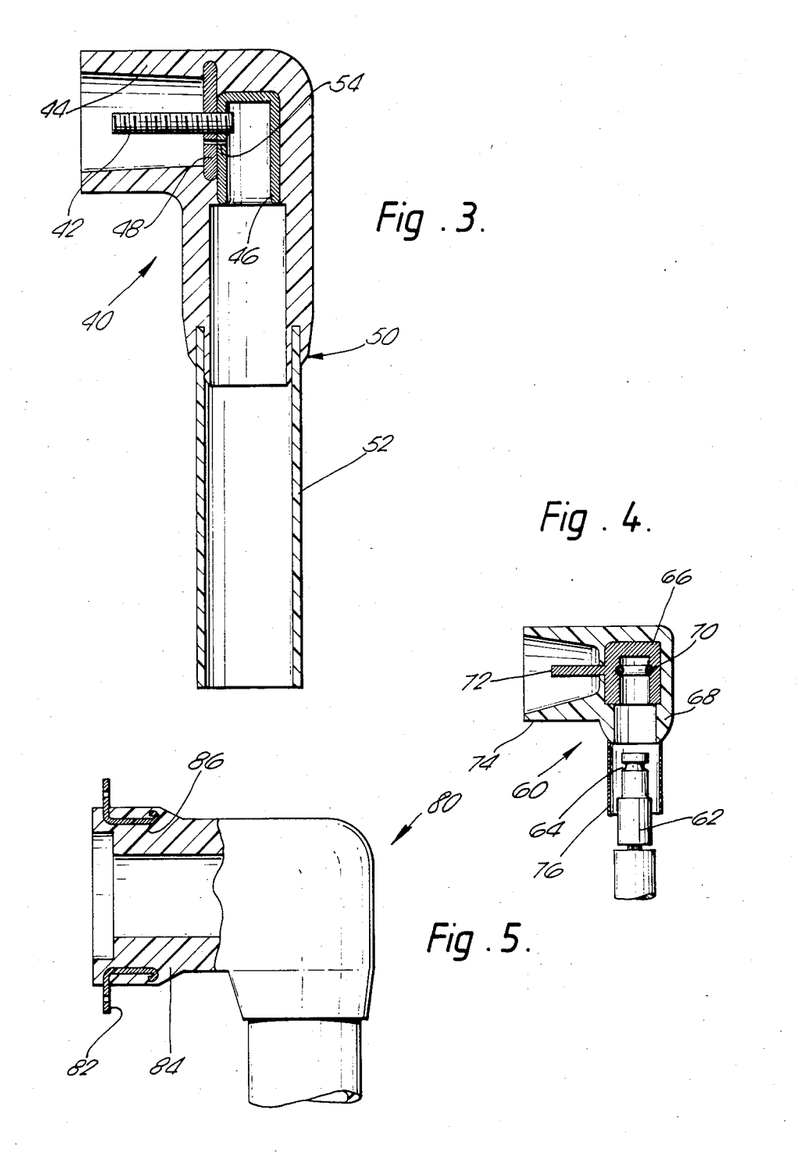
FIG. 3 is a section through another embodiment of connector.
FIG. 4 is a section through a further embodiment of connector.
FIG. 5 is a section through part of a connector, showing a modification that may be applied to any of the connectors of FIGS. 1 to 4.

The connector 40 of FIG. 3 is essentially the same as that of FIGS. 1 and 2, but differs in some important features. A contact pin 42 is screwed via a bushing socket 44 into a metal housing 46 moulded into the insulating sockets of the connector. However,a circular metal plate 48 is also retained in the insulating material and closes the inner end of the socket 44. The plate 48 provides electrical stress relief at the sliding interface between the bushing (not shown) and the socket 44.

The cable socket 50 of the connector 40 comprises HVTM tubing 52 moulded into the insulating body, but in this instance no retaining insert is provided. Accordingly, the wall thickness of the tubing 52 needs to be greater than that of the tubing 16 of the connector 2 (FIG. 1) to ensure its adequate retention within the moulded material of the connector body.

The connector 40 is furthermore provided with a passageway 54 to interconnect the bushing socket with the cable socket. The passageway 54 serves as an escape channel for air that is trapped within the bushing socket when the connector is pushed on to the bushing terminal of the electrical apparatus. This air can thus find its way into the cable, conveniently between the strands of the conductor, and thus facilitate mounting of the connector on to the bushing.

The connector 60 of FIG. 4 has a different electrically conductive arrangement from that of the connectors of FIG. 1 and 3, for electrically interconnecting the cable and the transformer bushing. A connecting lug 62 that is crimped on to the cable conductor has an annular groove 64 towards its free end. The lug 62 is arranged to co-operate with a conductive housing 66 that is moulded into the connector 60. The housing 66 has an opening aligned with the cable socket 68 of the connector, and receives the cable lug 62 therein. A spring lock ring 70 in the housing wall is arranged, on introduction of the cable into the connector 60 to engage in the lug groove 64 to provide mechanical retention of the cable in the connector and electrical connection between the cable conductor and the connector. Electrical connection to the transformer bushing terminal (not shown) is achieved by means of a contact pin 72 that is integral with the housing 66 and that extends into the bushing socket 74 of the connector 60. Electrical connection of the connector 60 on to the cable is thus effected simply by a push-fit interenagement and subsequently heat-shrinkable tubing 76 is recovered over the stripped cable.

The modification shown in the connector 80 of FIG. 5 relates to the provision of an annular metal flange 82 embedded in, and extending outwardly around, the connector socket arm 84 that co-operates with the transformer bushing (not shown). The flange 82 extends radially into the socket arm 84 and then axially therealong to provide a generally cylindrical portion 86 that, in use, surrounds the transformer bushing terminal (not shown), to provide electrical screening thereof. To this end, the flange 82 will, in use, be connected to a point at earth potential. In addition, the flange 82 may be used to provide a mechanical connection of the connector 80 on to the bushing.

Figure 6:
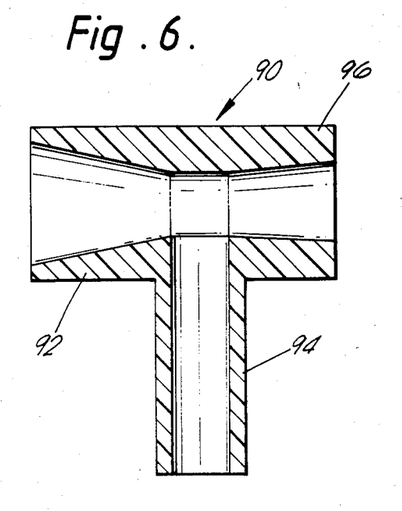
FIG. 6 is a section through part of a further connector, showing a modification that may be applied to any of the connectors of FIGS. 1 to 5.

Another modified connector is shown in FIG. 6. The connector 90 is of T-shape having three sockets. A first socket 92 has an internally tapered bore for co-operating with the standard CENELEC bushing, and a second socket 94, at right angles to the socket 92, has a heat-shrinkable stem and is arranged to receive the cable therein. The connector 90 has a third socket 96, that is aligned with the first socket 92 and that also is internally tapered. However, the internal configuration of the socket 96 is different from that of the socket 92 so as to mate with a bushing of other than CENELEC configuration. Thus, by appropriate orientation of the connector 90, the cable that in use is connected thereto may optionally be mounted on to a CENELEC bushing or another bushing. Alternatively, the aligned sockets 92 and 96 of the connector 90 may be used respectively to provide connection of the cable on to one or other of the bushing configurations, and a plugable access socket for effecting electrical connection of the cable to the connector and, or alternatively, to the bushing terminal.

It will, therefore, be appreciated that the electrically conductive means (not shown) of the connector 90 will be chosen and positioned in dependence on the particular use to which the connector is to be put, and may comprise a simple modification of the means discussed with reference to the other connectors herein described.

Figure 7:
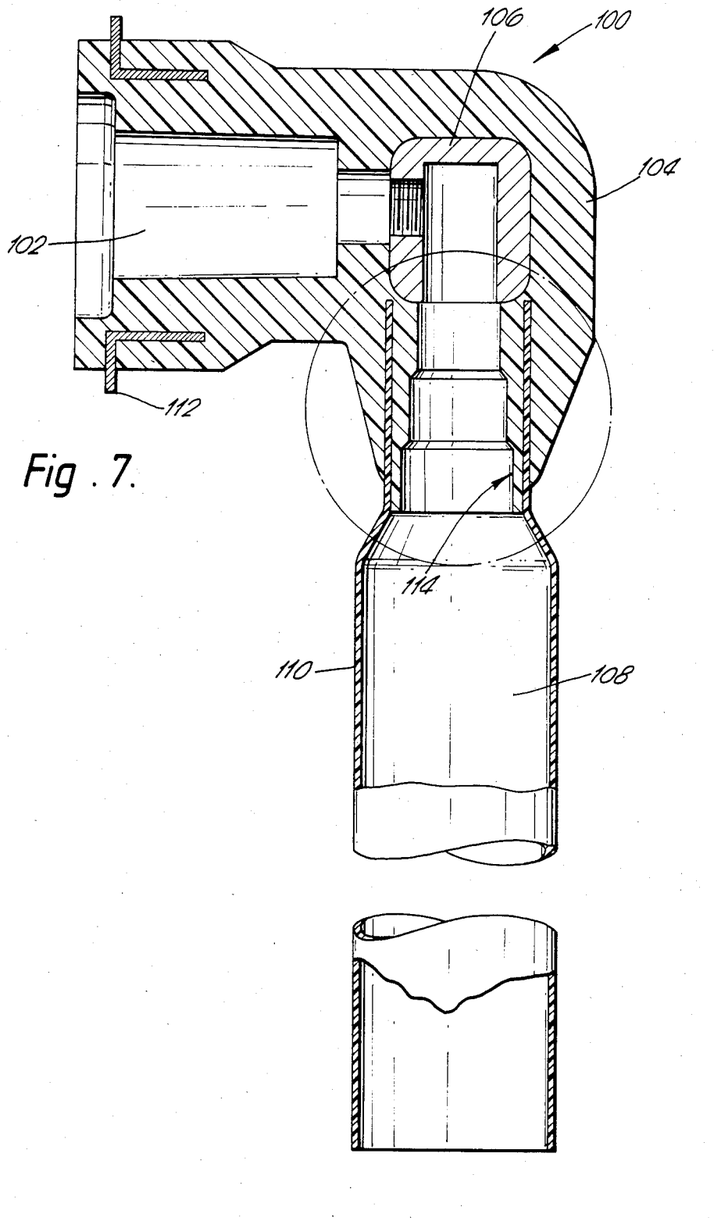
FIG. 7 is a section through a still further embodiment of the commector, showing a modification that may be applied to any of the connectors of FIGS. 1 to 6.

Referring to FIG. 7, it will be noted that the connector 100 has essentially the same features as the connectors already described, namely a first socket 102 in an insulating body portion 104 for mounting on to a bushing, an electrically conductive housing 106 (shown without the threaded contact pin), and a second socket 108 moulded into the body 104 and comprising a heat-shrinkable tube 110 for recovery on to an inserted cable (not shown). The connector 100 is also provided with a connecting and/or earthing flange 112.

A distinguishing feature of the connector 100, however, lies at the inner end of the socket 108, in the configuration radially inwardly of the inner end of the tube 110. This region is contained with the chain dotted circle of FIG. 7. The socket 108 in this region has a stepped wall 114 that defines three contiguous, substantially cylindrical portions of diameters that successively decrease towards the conductive housing 106.

The adaptor 100 accordingly is able to accommodate three sizes of cable, corresponding in diameter with respective ones of the three portions defined by the wall 114. Clearly, the exposed length of the cable conductor will also be varied, so as in each case to dispose the extremity thereof within the conductive housing 106.

The material of the connector body 104 is selected to be relatively soft, a soft elastomer for example, so that the cable forms a tight push fit therewith, thus minimising the occurrence of voids at the interface along the wall 114 between the cable and the connector. The electrical impulse performance of such a cable/connector connection is thus enhanced. It has been found that with a single connector having three stepped portions, the three most common cable size ranges, namely 35 mm$^2$ to 50 mm$^2$, 70 mm$^2$ to 95 mm$^2$, and 120 mm$^2$ to 150 mm$^2$, can conveniently be accommodated. Furthermore, the improved sealing afforded by using a soft material, allows a connector rated for use at 17.5 kV easily to withstand impulse voltages up to 110 kV.

It will be appreciated, that the connector may have a number of stepped portions other than three, for example two or four, if a different degree of versatility is required. Fruthermore, in any of the configurations described, the advantages of having a soft, and thus easily sealable, material contacting the cable may be achieved, even if the connector is arranged to accept nominally only a single size cable.

Figure 8:
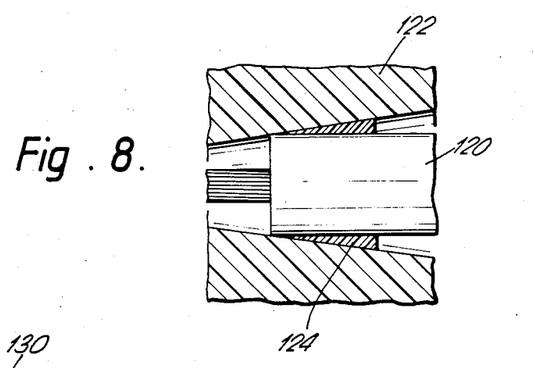
FIGS. 8 and 9 show respective detail modifications of the connector of FIG. 7.

Instead of the stepped configuration shown in FIG. 7, the cable socket of the connector may be provided with a uniform internal taper to extend its size range. With such a configuration, a compatibly tapered insert will be provided, in accordance with the size of cable to be connected. One example is shown in FIG. 8, where a cable 120 is introduced into a uniformly and inwardly tapering cable socket 122 of a connector, and an insert 124 of soft elastomeric insulating material having a corresponding tapered outer surface and a cylindrical inner surface locates and seals the cable 120 within the socket 122.

Figure 9:
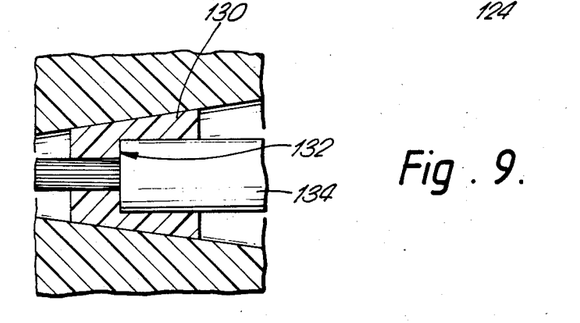

FIG. 9 shows a modification of the insert, whereby the insert 130 is itself stepped internally so as to engage over the cut back edge 132 of the cable insulation 134.

A different size insert may be provided for different size cable or for different cable size ranges.

It is to be understood that the bushing socket, or sockets, of the connectors hereinbefore described may be configured for co-operation with bushings other than the CENELEC standard bushing.

It is also to be understood that the features described herein with reference to particular connectors may be interchanged or used in conjunction, as appropriate, with features of other ones of the described connectors.

Although the connectors herein described are for connection on to a cable having one core, it will be appreciated that they may be applied separately to the individual cores of a multi-core cable to effect connection of such a cable on to individual bushings of electrical apparatus.

We claim:

1. A connector arranged to connect a high voltage electric cable to electrial apparatus, the connector comprising an electrically insulating body having a first socket arranged to receive an electrical terminal of the apparatus, and a second socket arranged to receive a stripped end of the cable and comprising a non-recoverable portion which is integral with the first socket and a recoverable tubular end portion which is molded at one end thereof into the non-recoverable portion; and electrically conductive means arranged to provide a conductive path between the first and second sockets thereby, in use, to provide electrical interconnection between the cable and the terminal of the apparatus, the electrically conductive means being contained wholly within the insulating body of the connector.

2. A connector arranged to connect a high voltage electric cable to electrical apparatus, the connector comprising an electrically insulating body having a first socket arranged to receive an electrical terminal of the apparatus, and a second socket arranged to receive a stripped end of the cable and comprising a non-recoverable portion and a recoverable tubular end portion, one end of which is recovered onto a tubular support member, said one end and said support member being molded into the non-recoverable portion; and electrically conductive means arranged to provide a conductive path between the first and second sockets thereby, in use, to provide electrical interconnection between the cable and the terminal of the apparatus, the electrically conductive means being contained wholly within the insulating body of the connector.

3. A connector according to claim 1 or 2, wherein the electrically conductive means comprises a screw-threaded pin member that is co-operable with an internally-threaded portion of the connector so as to be introduced through said first socket and to provide, in use, electrical contact with the conductor of the cable.

4. A connector according to claim 3, wherein the internally-threaded portion of the connector comprises an electrically conductive portion that is disposed in the second socket and that is arranged to receive the end of the cable.

5. A connector according to claim 1 or 2, wherein the electrically conductive means comprises a pin member, integral with the insulating body of the connector, that is electrically connected to means for retaining within the connector the end of a cable that is introduced, in use, into the second socket of the connector.

6. A connector according to claim 1 or 2, comprising a further socket suitable for providing access to the electric cable that is introduced, in use, into the second socket.

7. A connector according to claim 1 or 2, comprising an air-bleed passageway between the sockets thereof.

8. A connector according to claim 1 or 2, wherein the second socket is defined by a wall of soft material such that, in use, the cable is a tight push-fit thereinto.

9. A connector according to claim 1 or 2, wherein the inner wall of the second socket is arranged such that the connector can accommodate a cable of more than one size.

10. A connector according to claim 1 or 2, comprising at least one insert that is arranged to be mounted in the second socket, such that the connector is suitable for receiving, in use, a cable of more than one size.

* * * * *